United States Patent
Benimeli

(10) Patent No.: US 6,894,500 B2
(45) Date of Patent: May 17, 2005

(54) METHOD AND APPARATUS FOR DETERMINING THE RESISTIVITY OF A FORMATION SURROUNDING A CASED WELL

(75) Inventor: Dominique Benimeli, Chatillon (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/488,665

(22) PCT Filed: Aug. 8, 2002

(86) PCT No.: PCT/EP02/08877

§ 371 (c)(1),
(2), (4) Date: Mar. 4, 2004

(87) PCT Pub. No.: WO03/023453

PCT Pub. Date: Mar. 20, 2003

(65) Prior Publication Data

US 2004/0249572 A1 Dec. 9, 2004

(30) Foreign Application Priority Data

Sep. 6, 2001 (EP) .......................................... 01402306

(51) Int. Cl.⁷ ................................................. G01V 3/02
(52) U.S. Cl. ..................................................... 324/368
(58) Field of Search ................................. 324/347, 348, 324/351, 368–375, 338–339; 702/6–7; 367/25, 35; 181/102, 105

(56) References Cited

U.S. PATENT DOCUMENTS 2,729,784 A   1/1956  Fearon
4,901,023 A   2/1990  Wail, III
6,415,864 B1 * 7/2002  Ramakrishnan et al. ............................................. 166/250.03
6,603,314 B1 * 8/2003  Kostelnicek et al. ........ 324/368

FOREIGN PATENT DOCUMENTS

GB    2011085 A      7/1979
WO    WO 0079307 A  12/2000

* cited by examiner

Primary Examiner—Bot LeDynh
(74) Attorney, Agent, or Firm—Victor H. Segura; Brigitte L. Echols

(57) ABSTRACT

Apparatus for measuring the resistivity of a formation surrounding a borehole having a conductive casing comprises a tool body; first and second current injectors spaced apart on the tool body for injecting current into the casing; and an insulating body portion disposed between the current injectors, at least three ring electrodes being mounted on the insulating body portion between the current injectors. A method of determining the resistivity of a geological formation surrounding a borehole having a conductive casing comprises positioning the tool in the borehole, applying an electric current to the casing from at least one of the current injectors such that current leaks into the formation from the casing at the level of the ring electrodes; shunting the current by a feedback circuit connected to a first pair of the ring electrodes and measuring the voltage drop due to current leaking in to the formation across a second pair of the ring electrodes, the feedback circuit being configured such that the current flowing along the casing at the level of the first pair of ring electrodes is small compared with the shunt current; determining the leakage current into the formation from the voltage drop measured across the second pair of electrodes; and determining the resistivity of the formation from the leakage current.

12 Claims, 2 Drawing Sheets

METHOD AND APPARATUS FOR DETERMINING THE RESISTIVITY OF A FORMATION SURROUNDING A CASED WELL

The present invention relates to methods and apparatus for determining the resistivity of geological formations, in particular formations surrounding a well having a conductive, metal casing.

The significance of resistivity logs in oil prospecting is well known. The resistivity of a formation depends essentially on the fluid it contains. A formation containing salt water, which is conductive, has resistivity that is much lower than a formation filled with hydrocarbons, and consequently resistivity measurements are of great value for locating hydrocarbon deposits. Resistivity logs have been widely available for a long time, particularly by means of devices having electrodes for measurement of current or voltage. However, most existing techniques are limited to use in wells that are not cased ("open holes"). The presence of metal casing in a well, where the resistivity of metal is very small compared with values that are typical for geological formations (about $2 \times 10^7$ ohm.m for steel casing compared with 1 to 100 ohm.m for a formation), represents a considerable barrier to sending electrical currents into the formation from within the casing. As a result, it is most common for resistivity measurements to be performed before the casing is put into place. It is therefore difficult to make resistivity measurements from wells that are in production since they are usually provided with a metal casing.

It has also been recognized that it is advantageous to be able to measure resistivity in cased sections of wells. Such measurements, performed in a well that is in production and at the level of the deposit, would make it possible to locate the water-hydrocarbon interfaces, and thus to track the positions of such interfaces over time, in order to monitor the behavior of the hydrocarbon deposit and optimize exploitation thereof. It would also be possible to obtain resistivity measurements in a well (or a section of well) where no measurements were performed prior to the casing being put into place, in particular to improve knowledge about the deposit, and perhaps find productive layers that were not located initially.

There have been several previous proposals to address the problem of resistivity measurements from within a casing. The principle on which such measurements are based, described in U.S. Pat. No. 2,459,196, consists in causing a current to flow along the casing under conditions in which current leaks out or is lost to the formation. This loss is a function of the resistivity of the formation, the more conductive the formation the greater the loss, thus by measuring the loss it is possible to determine the resistivity of the formation. Current loss is evaluated by establishing a profile for the current flowing along the casing. U.S. Pat. No. 2,729,784 describes a measurement method that uses three measurement electrodes spaced apart along the casing and forming pairs of adjacent electrodes that are theoretically identical. Current electrodes are placed on either side on the measurement electrodes to inject currents in opposite directions into the casing. A feedback loop servo-controls current injection so as to put the outer measurement electrodes at the same potential for the purpose of eliminating the effect of differences in the resistance of the casing in the sections defined by the measurement electrodes. A value for the leakage current at the middle electrode is obtained by measuring the voltage drop in each of the pairs of electrodes and by taking the difference between the voltage drops, said difference being stated to be proportional to the leakage current. U.S. Pat. No. 2,891,215 describes a method of the same type using an additional current electrode level with the middle measurement electrode, and disposed so as to apply a current which exactly compensates the leakage current.

FR 2,207,278 provides for the use of three regularly-spaced measurement electrodes to measure current leakage, and it describes a two-stage method: a first stage for measuring the resistance of the section of casing defined by the measurement electrodes, during which stage the current is caused to flow along the casing so that there is no leakage into the formation; and a second stage during which a current leak can take place into the formation. To this end, a current injection system is provided that comprises an emitter electrode and two return electrodes, one close to the measurement electrodes and active during the first stage, and the other situated on the surface, and active during the second stage.

U.S. Pat. No. 4,796,186 describes a two-stage method of the same type as above-mentioned French patent 2,207,278, and uses the same disposition of electrodes. It provides a circuit for eliminating the effect of variations in resistance between the two sections of casing, which circuit comprises amplifiers connected to each pair of measurement electrodes so as to deliver respective output voltage drops. One of the amplifiers has variable gain, and its gain is adjusted during the first stage so as to cancel the difference between the outputs from the amplifiers. This technique is difficult to implement, given the orders of magnitude specified above and requires two distinct measurement stages.

At least two commercial services have been made available for the measurement of formation resistivity from within a cased borehole, the CHFR of Schlumberger and the TCRT of ParaMagnetic Logging/Baker Atlas. In both of these, the current injectors and measurement electrodes are placed in contact with the casing when measurements are made. With such an arrangement, continuous logging is very difficult. Because the currents/voltages measured by the measurement electrodes are very small, the electrical noise or interference created by dragging a contact electrode along a casing while making a measurement can be significant compared to the values to be measured. Also, the electrodes themselves are small and easily damaged if logged continuously at high speed. The need to mount electrodes on arm or pads also increases the complexity of the measurement sonde and limits the minimum diameter that can be achieved for the sonde and hence limits its use through tubing.

Most of the previously proposed measurement methods all require separate measurements of casing resistance and leakage current, often making it necessary to stop the tool at each location to ensure that the two measurements are made at the same point. This tends to reduce logging speeds and prevent continuous logging.

It is an object of the present invention to provide methods and apparatus which obviate or mitigate some or all of the problems identified above.

In accordance with one aspect of the invention, there is provided apparatus for measuring the resistivity of a formation surrounding a borehole having a conductive casing, comprising:
i) a tool body;
ii) first and second current injectors spaced apart on the tool body for injecting current into the casing; and
iii) an insulating body portion disposed between the current injectors, at least three ring electrodes being mounted on the insulating body portion between the current injectors.

The current injectors can be of a contact type, or, if conditions permit, ring electrodes similar to the measurement electrodes.

More than three measurement electrodes can be provided, as required.

The tool body is essentially a mandrel sonde and providing the measurement electrodes as ring electrodes avoids the problems associated with the use of contact electrodes when logging continuously.

Another aspect of the invention provides a method of determining the resistivity of a geological formation surrounding a borehole having a conductive casing, comprising:
i) positioning a measurement tool in the borehole, the tool comprising a tool body, first and second current injectors spaced apart on the tool body for injecting current into the casing, and an insulating body portion disposed between the current injectors, at least three ring electrodes being mounted on the insulating body portion between the current injectors;
ii) applying an electric current to the casing from at least one of the current injectors such that current leaks into the formation from the casing at the level of the ring electrodes;
iii) shunting the current by a feedback circuit connected to a first pair of the ring electrodes and measuring the voltage drop due to current leaking in to the formation across a second pair of the ring electrodes, the feedback circuit being configured such that the current flowing along the casing at the level of the first pair of ring electrodes is small compared with the shunt current;
iv) determining the leakage current into the formation from the voltage drop measured across the second pair of electrodes; and
v) determining the resistivity of the formation from the leakage current.

By measuring the voltage drops using ring electrodes, it is possible to log the tool continuously through the borehole and so increase logging speed.

Examples of the invention are described below with reference to the accompanying drawings, in which.

The principle on which resistivity is measured from a cased well involves causing a current to flow along the casing with a remote return so as to enable current to leak into the geological formations around the well, and evaluating the leakage current at a given level. The more conductive the formation surrounding the well at that given level, the greater the leakage current. This can be expressed in mathematical terms by an exponentially decreasing relationship for the current flowing in the casing, with a rate of decrease, at a given level, that is a function of the ratio between the resistivity of the formation Rt and the resistivity of the casing Rc.

Figure 1:
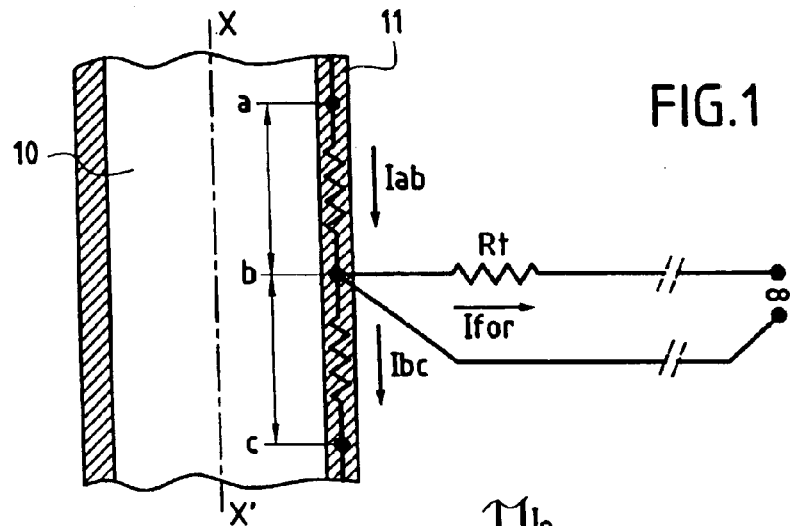
FIG. 1 is a schematic diagram illustrating the principle of measuring resistivity from a cased well.

The diagram of FIG. 1 shows a section of a well 10 of axis X—X' fitted with metal casing 11. The level (or depth) at which it is desired to obtain a measurement is referenced b, a section of casing ac extending on either side of level b. If a current flows in the casing with a remote return (e.g. at the surface), current loss into the formation can be represented, in electric circuit terms, by a shunt resistor placed between the level b of the casing and infinity. The resistance of this resistor is representative of the resistivity Rt of the formation at level b. Using Ohm's law, it is thus possible to write:

$$Rt = k(V_{b,\infty}/Ifor)$$

where k is a geometrical constant which can be determined by calibration measurements, $V_{b,\infty}$ is the potential of the casing at level b relative to infinity, and Ifor is the leakage current at level b.

The loss of current at level b can be described as a difference between current entering level b and current leaving it. Making the approximation that the current varies discretely, it can be assumed that the current in the section ab, and the current in the section bc are both constant, with these currents being taken to be equal to respective mean currents $I_{ab}$ and $I_{bc}$ in those sections, and the leakage current Ifor is determined as the difference between the currents $I_{ab}$ and $I_{bc}$:

$$Ifor = I_{ab} - I_{bc} \qquad [2]$$

Since $I_{ab}$ and $I_{bc}$ are mean values over the sections ab and bc:

$$Ifor = V_{ab}/R_{ab} - V_{bc}/R_{bc} \qquad [2']$$

where $V_{ab}$ and $V_{bc}$ are the potential drops respectively along the sections ab and bc of casing, and where $R_{ab}$ and $R_{bc}$ are the respective resistances of the sections ab and bc of the casing.

Figure 2:
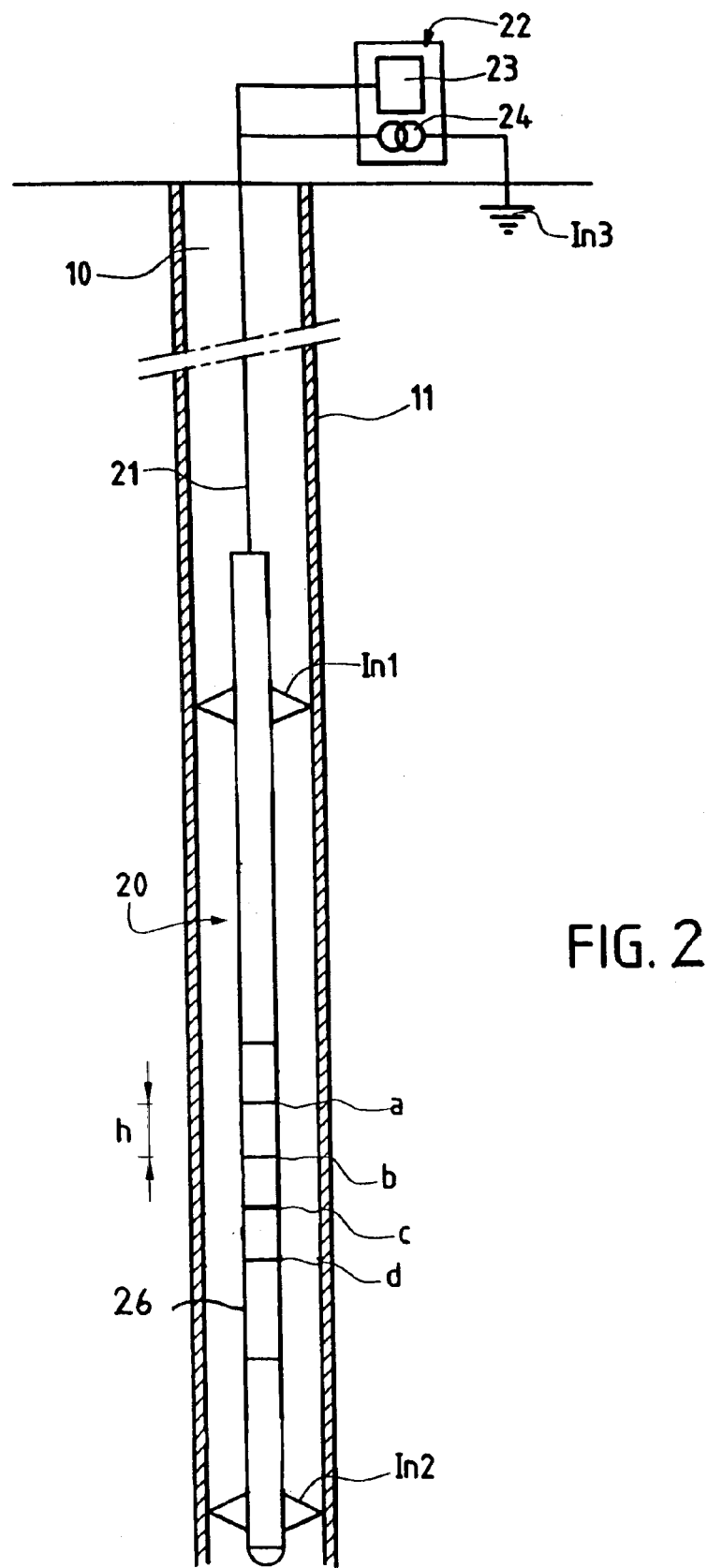
FIG. 2 shows one embodiment of a tool incorporating the present invention.

A tool incorporating an embodiment of the invention is shown diagrammatically in FIG. 2. FIG. 2 shows borehole 10 having a metallic, conductive casing 11, and a sonde generally indicated at 20, which is suspended at the end of an electric cable 21 so that it can be logged up the borehole in a conventional manner. The cable 21 is connected to surface equipment 22 comprising a winch (not shown), a data acquisition and processing unit 23, and an electrical power source 24. The sonde 20 has a central, non-conducting section 26 on which are mounted four metallic ring measurement electrodes a, b, c, and d which define the measurement sections of casing ab, be, and cd each of a length suitably chosen to lie in the range 40 cm to 80 cm. The sonde also has current injection electrodes disposed beyond electrodes a and d, i.e. a top electrode In1 and a bottom electrode In2, with these electrodes being at distances from the electrodes a and d which can be of the same order as or slightly greater than the distance between the electrodes a and d, e.g. a few meters. The current electrodes In1 and In2 can be made in the manner conventional for centralizers for use in cased wells. The wheels normally provided on such centralizers for making contact with the casing are then replaced by elements suitable for acting as current electrodes, and electrical conductors are provided to connect to the electrode-forming elements. It is also possible that the current electrodes In1 and In2 be constituted by ring electrodes, i.e. avoiding direct contact with the casing. The efficacy of such an arrangement will be dependent on the conductivity of the borehole fluid and may not be applicable in all circumstances.

The sonde also has an electronics subassembly (not shown). This subassembly suitably comprises the amplifiers 12, 13, and 14-1, 14-2 described below with reference to FIGS. 3 and 4. The output signals from these circuits are preferably digitized and transmitted to the surface for processing in the unit 23 to determine the resistivity of the formation.

The apparatus also has a remote return electrode In3, preferably placed on the surface at the well head (if the well is deep enough) or at a distance from the well head, and it also has means for feeding electricity to the electrodes. These means comprise the above-mentioned surface source 16 and, where appropriate, an additional source placed within the sonde, together with appropriate switching circuits.

Figure 3:
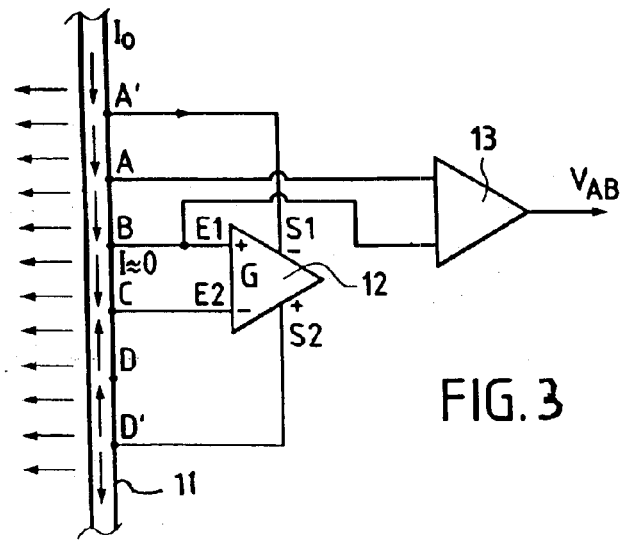
FIG. 3 shows a diagram illustrating a first implementation of the method of the invention.
Figure 4:
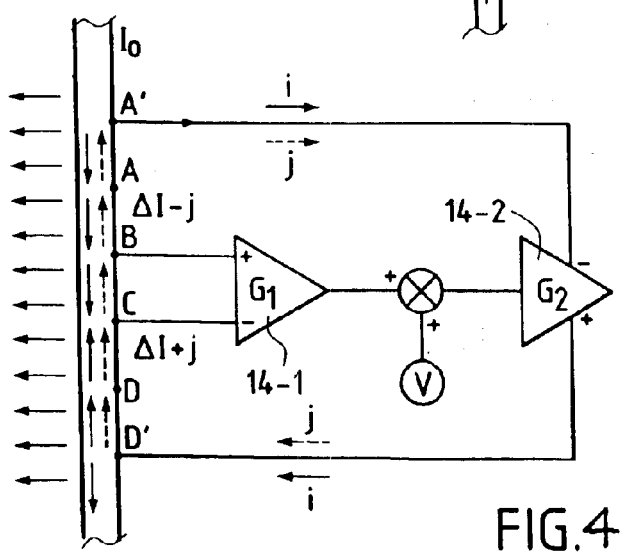
FIG. 4 is a diagram illustrating a second implementation of the invention.

FIG. 3 shows schematically the arrangement of the electronics for making the measurements of formation resistivity. In FIG. 3, there can be seen the borehole 10 and the casing 11 to which a current $I_0$ is applied by the injection electrode (not shown) with the return being remote so that current leaks into the formation, as represented by the parallel arrows.

In FIG. 3, there can be seen axially spaced-apart levels A, B, C, and D on the casing 11, defining sections AB, BC, and CD. Because the current flow is axially along the casing, at a given depth, the radial plane inside the casing at that depth is an equipotential plane and a potential measurement made at any point in that plane will be the same as a potential measurement made on the casing at that depth. For simplicity, the electrodes are shown in contact with the casing at levels A–D even though they do not actually contact the casing. In FIG. 3, the ring electrodes a–d are given the references A–D respectively. The middle electrodes B and C are connected respectively to inputs E1 and E2 of an amplifier 12 having high gain G. The amplifier 12 is connected in parallel with the circuit formed by the casing 11, the outputs S1 and S2 of the amplifier 12 being connected to the casing 11 at respective levels A' and D' situated beyond the respective ends of the section extending between levels A and D. The amplifier 12 constitutes a feedback loop which acts to reduce the potential difference between the inputs E1 and E2 to a value that is substantially zero, or in any event very small. The voltage drop between electrodes B and C, and thus the current $I_{BC}$ which flows between these electrodes can then be considered as being substantially zero, or in any case very small. Substantially all of the current is thus diverted to the shunt circuit including the amplifier 12. Under such conditions, the current flowing along the casing outside the section BC under the control of the amplifier 12 is substantially equal to the current Ifor which leaks into the formation. The potential difference $V_{AB}$ between the electrodes A and B (or the potential difference $V_{CD}$ between the electrodes C and D) is then substantially proportional to the leakage current Ifor:

$$Ifor \cong V_{AB}/R_{AB} \text{ (or } Ifor \cong -V_{CD}/R_{CD}) \quad [3]$$

This potential difference is measured by an amplifier 13 whose inputs are connected to the electrodes A and B (or the electrodes C and D) and whose output voltage is the difference between the input voltages.

This eliminates substantially all of the difficulties associated with uncertainty concerning the resistances $R_{AB}$ and $R_{BC}$ of the sections of casing. It results from equations [3] above that uncertainty $\Delta R$ concerning the resistance of the section of casing $R_{AB}$ (or $R_{CD}$) has an effect on uncertainty concerning the leakage current only in the form of a relative term $\Delta R/R$ which is typically of the order of $10^{-2}$ under real conditions. The influence of the uncertainty $\Delta R$ is thus reduced in decisive manner. In addition, the invention makes it possible to obtain the leakage current in a single measurement stage and thus permits continuous logging.

As is stated above, the current $I_{BC}$ flowing in the section BC must be substantially zero or in any event small. It is appropriate to set the gain of the amplifier 12 in such a manner that the ratio of the current flowing between levels A' and D' and the current diverted to the amplifier is no greater than about $10^{-2}$, given that the exact ratio varies depending on conditions and measurement context, for example within a given borehole, it varies with the depth at which the measurement is taken, and therefore it cannot be fixed a priori. The above-mentioned order of magnitude suffices firstly to obtain a result that is acceptable from the point of view of reducing the influence of the uncertainty $\Delta R$, and secondly it does not require the gain of the amplifier 12 to be excessively large. Defining suitable characteristics for the amplifier 12 is within the competence of the person skilled in the art.

With values of this order, the current $I_{BC}$ and thus the voltage $V_{BC}$ need not necessarily be completely negligible, and to obtain better accuracy it is preferable to use the voltage $V_{BC}$ obtained at the output of the amplifier 12 in order to determine the leakage current Ifor, in application of above equation [2']. Nevertheless, the approximate method of determination based on equation [3], which does not make use of the voltage $V_{BC}$ also comes within the ambit of the invention.

The circuit described above has an amplifier 12 which serves both as a feedback circuit and as a circuit for measuring the voltage $V_{BC}$.

A variant implementation of that circuit consists in separating these functions by providing a first amplifier for feedback purposes and a second amplifier for measuring $V_{BC}$. The feedback circuit comprising the first amplifier can then be in effective electrical contact with the casing at points that are other than the points B and C, e.g. points A and D. This variant thus provides greater flexibility.

Furthermore, according to equations [3] or [2'], measuring the leakage current requires knowledge of the resistance of the section of casing over which voltage drop is measured. Given the above observation, the resistances in question do not need to be known very accurately. This opens up various possibilities.

A first possibility consists merely in calculating these resistances as a function of available data concerning the casing at the level under consideration (inside diameter, outside diameter, resistivity) together with other parameters involved (the distances AB, BC, CD, and temperature at the level under consideration).

Another possibility consists in determining the resistances under consideration by a measuring stage that is distinct from the main operation as described above. A current is caused to flow in the sections of casing AB, BC, and CD so that there is no leakage into the formation, with this being done by a circuit comprising an injection electrode and a return electrode in contact with the casing at levels that are close to the levels A and D respectively, and the voltage drops over the sections of casing under consideration are measured.

A third solution can be envisaged for determining the resistance $R_{AB}$ or $R_{CD}$ simultaneously with the main operation. This solution is implemented by means of the circuit shown diagrammatically in FIG. 4.

The principle consists in measuring the resistance $R_{AB}$ or $R_{CD}$ with current at a frequency f that is different from the frequency $f_0$ used for the main measurement. The feedback loop shown in FIG. 4 has two amplifiers 14-1 and 14-2 of respective gains $G_1$ and $G_2$. A voltage v is applied between the amplifiers 14-1 and 14-2. This causes a current j to pass round the loop and along the casing, as represented by dashed lines. Given the dimensions of the circuit traveled by this current j, it circulates essentially in the thickness of the casing and it does not depend on the resistivity of the formation. By measuring the current j, it is possible to determine the resistance of the casing using the following equation:

$$R_{AB} = v/G_1 \cdot j \quad [4]$$

Because it is possible to measure the casing and formation signal simultaneously, it is not necessary to stop the tool while the measurement is being made and continuous logging is therefore possible.

The voltage $V_{AB}$ (or $V_{CD}$) is obtained as described with reference to FIG. 3 by means of an amplifier (not shown in FIG. 4) whose inputs are connected to the electrodes a and b (or c and d).

It is mentioned above that the voltage $V_{AB}$ or the voltage $V_{CD}$ is measured. In practice, it is advantageous to measure both of these voltages simultaneously since that makes it possible in a single stage to obtain two measurements corresponding to two different levels in the borehole, one for level B, the other for level C. This approach may not be applicable to a tools that is logging continuously.

The above-described means make it possible to determine the leakage current Ifor. To determine the resistivity of the formation Rt, it remains to determine the potential of the casing relative to a reference at infinity $V_{B,\infty}$, as described above. Although not subject matter of the present invention, indications are given below on how to determine the potential of the casing.

The usual method consists in using reference electrodes placed on the surface at a distance from the surface return electrode In3. The potential difference $V_{bs}$ is thus measured between the casing at the level B of the measurement electrode b and the reference electrode. Using above equation [1], the ratio $K \cdot V_{bs}/I_{for}$ is formed, where K is the above-mentioned constant, in order to deduce the resistivity of the formation Rt.

Another method which avoids the use of a reference electrode, is described in French patent application 99/05341 of Apr. 28, 1999, to which reference can be made for a more detailed explanation.

What is claimed is:

1. An apparatus for measuring the resistivity of a formation surrounding a borehole having a conductive casing, comprising:
   a tool body;
   first and second current injectors spaced apart on the tool body for injecting current into the casing;
   an insulating body portion disposed between the current injectors, at least three ring electrodes being mounted on the insulating body portion for measuring voltage drops along the casing between the current injectors; and
   a feedback circuit that is configured to shunt said current such that the current flowing along the casing at the level of at least a pair of said ring electrodes is small compared with the shunt current.

2. The apparatus of claim 1, wherein more than three ring electrodes are provided on the insulating body portion.

3. The apparatus of claim 1, wherein the current injectors comprise: electrodes which contact the casing.

4. The apparatus of claim 3, wherein more than three ring electrodes are provided on the insulating body portion.

5. The apparatus of claim 1, wherein the current injectors comprise ring electrodes mounted on the tool body.

6. The apparatus of claim 5, wherein more than three ring electrodes are provided on the insulating body portion.

7. A method of determining the resistivity of a geological formation surrounding a borehole having a conductive casing, comprising:
   i) positioning a measurement tool in the borehole, the tool comprising a tool body, first and second current injectors spaced apart on the tool body for injecting current into the casing, and an insulating body portion disposed between the current injectors, at least three ring electrodes being mounted on the insulating body portion for measuring voltage drops along the casing between the current injectors;
   ii) applying an electric current is to the casing between the current injectors such that current leaks into the formation from the casing at the level of a central ring electrode;
   iii) shunting the current by a feedback circuit connected to the ring electrodes on either side of the central ring electrode, the feedback circuit being configured such that the current flowing along the casing at the level of the central ring electrode is small compared with the shunt current;
   iv) determining the difference between the voltage drops on adjacent sections of casing situated on either side of the level of the central ring electrode is determined so as to deduce the leakage current into the formation; and
   v) determining the resistivity of the formation from the leakage current.

8. The method of claim 7, wherein the voltage drop over at least one section of casing including the level is measured, the resistance of the section is determined, and the leakage current is deduced therefrom.

9. The method of claim 7, wherein the tool is moved in a substantially continuous manner through the borehole as the measurements are being made.

10. The method of claim 9, wherein the voltage drop over at least one section of casing including the level is measured, the resistance of the section is determined, and the leakage current is deduced therefrom.

11. The method of claim 10, wherein the resistance of the section of casing is determined during the same stage as the voltage drop is measured.

12. The method of claim 11 wherein the resistance of the section of casing and the voltage drop are measured at different frequencies.

* * * * *